United States Patent
Ueyama (10) Patent No.: US 9,503,595 B2
(45) Date of Patent: Nov. 22, 2016

(54) IMAGE FORMING APPARATUS (71) Applicant: Brother Kogyo Kabushiki Kaisha, Nagoya-shi, Aichi-ken (JP)

(72) Inventor: Junki Ueyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/552,731

(22) Filed: Nov. 25, 2014

(65) Prior Publication Data

US 2015/0146251 A1 May 28, 2015

(30) Foreign Application Priority Data

Nov. 25, 2013 (JP) ................... 2013-243166

(51) Int. Cl.
*G06F 15/00* (2006.01)
*H04N 1/00* (2006.01)
*G06K 15/12* (2006.01)

(52) U.S. Cl.
CPC .......... *H04N 1/00559* (2013.01); *G06K 15/12* (2013.01); *H04N 1/00315* (2013.01); *H04N 1/00557* (2013.01); *H04N 2201/0039* (2013.01); *H04N 2201/0055* (2013.01); *H04N 2201/0063* (2013.01); *H04N 2201/0094* (2013.01)

(58) Field of Classification Search
None
See application file for complete search history.

(56) References Cited

U.S. PATENT DOCUMENTS

| 7,826,753 | B2 | 11/2010 | Watanabe | |
| 2006/0246866 | A1* | 11/2006 | Nakagawa et al. | 455/301 |
| 2008/0012771 | A1* | 1/2008 | Watanabe | 343/700 MS |
| 2012/0321342 | A1* | 12/2012 | Mori | 399/111 |
| 2013/0141758 | A1* | 6/2013 | Yoneda et al. | 358/1.15 |

FOREIGN PATENT DOCUMENTS

| JP | 2006-053477 A | 2/2006 |
| JP | 2006-056017 A | 3/2006 |
| JP | 2008-009293 A | 1/2008 |
| JP | 2013-230567 A | 11/2013 |
| JP | 2013230567 A * | 11/2013 |

* cited by examiner

Primary Examiner — Helen Q Zong
(74) Attorney, Agent, or Firm — Banner & Witcoff, Ltd.

(57) ABSTRACT

An image forming apparatus includes an image forming unit configured to form an image on a sheet, a wireless board for a wireless communication, a discharge tray having a placement surface on which the sheet having an image formed thereon is placed, and a wall part provided at one end-side of the discharge tray in a width direction and having a wall surface standing upwardly beyond the placement surface, wherein at least a part of the wireless board is positioned in the wall part.

21 Claims, 7 Drawing Sheets

IMAGE FORMING APPARATUS

CROSS-REFERENCE TO RELATED APPLICATIONS

This application claims priority from Japanese Patent Application No. 2013-243166 filed on Nov. 25, 2013, the entire subject-matter of which is incorporated herein by reference.

TECHNICAL FIELD

The disclosure relates to an image forming apparatus configured to form an image on a sheet.

BACKGROUND

There has been proposed an image forming apparatus which can be connected to a computer and the like through a wireless board by wireless communication. The wireless board is mounted to main body frames.

The main body frames are strength members provided at both sides in a horizontal direction with an image forming unit being interposed therebetween, and are provided to hold the image forming unit. In the related-art image forming apparatus, the main body frames are made of metal. For this reason, the wireless board is arranged at a notched part formed by notching a part of the main body frames.

SUMMARY

In the related-art image forming apparatus, the main body frames are positioned at both sides in the horizontal direction with the image forming unit being interposed therebetween and are configured to hold the image forming unit. That is, the main body frames are positioned at parts at which the image forming unit is covered from the horizontal direction.

For this reason, when the wireless board is simply mounted to the main body frames, the wireless board may be positioned at a part overlapping with the image forming unit in the horizontal direction. When the wireless board is arranged at the corresponding position, communication sensitivity may be lowered.

Therefore, illustrative aspects of the present invention provide an image forming apparatus capable of preventing communication sensitivity from being lowered.

According to one illustrative aspect of the present invention, there may be provided an image forming apparatus including: an image forming unit configured to form an image on a sheet; a wireless board for a wireless communication; a discharge tray having a placement surface on which the sheet having an image formed thereon is placed; and a wall part provided at one end-side of the discharge tray in a width direction and having a wall surface standing upwardly beyond the placement surface, wherein at least a part of the wireless board is positioned in the wall part.

In the present invention, the wall part is provided at one end-side of the discharge tray in the width direction. It is difficult to accommodate the image forming unit in the wall part. That is, the image forming unit does not exist in the wall part. Further, it is possible to prevent communication sensitivity from being lowered due to the image forming unit.

Incidentally, even when the sheet is placed on the discharge tray, there is a very low possibility that the sheet will cause a wireless communication failure, because the sheet is not metal. Therefore, even when the sheet is placed on the discharge tray, it is possible to prevent the communication sensitivity from being lowered.

DETAILED DESCRIPTION

Illustrative embodiments of the present invention will now be described with reference to the drawings.

The reference numerals denoting the respective means and the like are described in illustrative embodiments, which will be described later. However, it should be understood that the present invention is not limited to the specific means and the like denoted with the reference numerals.

The 'illustrative embodiments of the present invention' that will be described below are exemplary. That is, the features of the present invention defined in the claims are not limited to the specific means, structures and the like described in the below illustrative embodiments.

In the illustrative embodiments, an image forming apparatus of the present invention is applied to a monochrome printer. The arrows indicating directions and the like denoted in the drawings are shown so as to easily understand relations between the drawings. The present invention is not limited to the directions denoted in the drawings.

A member or part denoted with a reference numeral is provided at least one, except that the terms 'a plurality of', 'two or more' and the like are used. Hereinafter, the illustrative embodiments of the present invention are described with reference to the drawings.

First Illustrative Embodiment (1) Outline of Image Forming Apparatus

Figure 1:
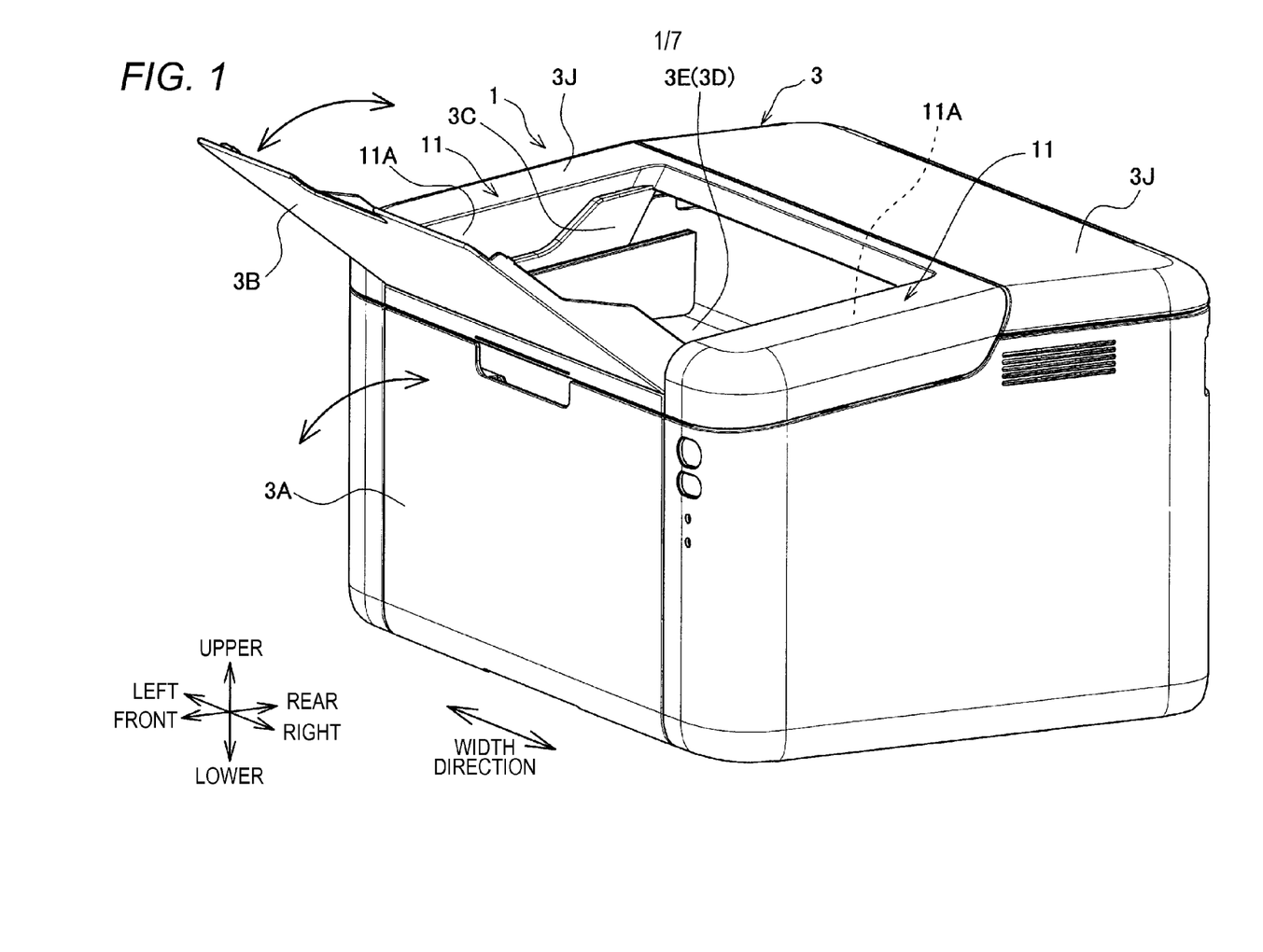
FIG. 1 is an outward perspective view of an image forming apparatus 1 according to a first illustrative embodiment of the present invention.

As shown in FIG. 1, an image forming apparatus 1 of this illustrative embodiment is a printer having an image forming unit 5 (which will be described later) accommodated in a housing 3. A sheet feeding cover 3A is rotatably mounted to a front surface side of the housing 3. A sheet discharge cover 3B is rotatably mounted to an upper surface side of the housing 3.

Incidentally, FIG. 1 illustrates a state where the sheet feeding cover 3A is closed. The sheet feeding cover 3A consisting of a substantial rectangular plate is rotated forwards about a rotational shaft (not shown) provided at a lower end-side thereof, which is a center of rotation, and is thus opened.

Figure 2:
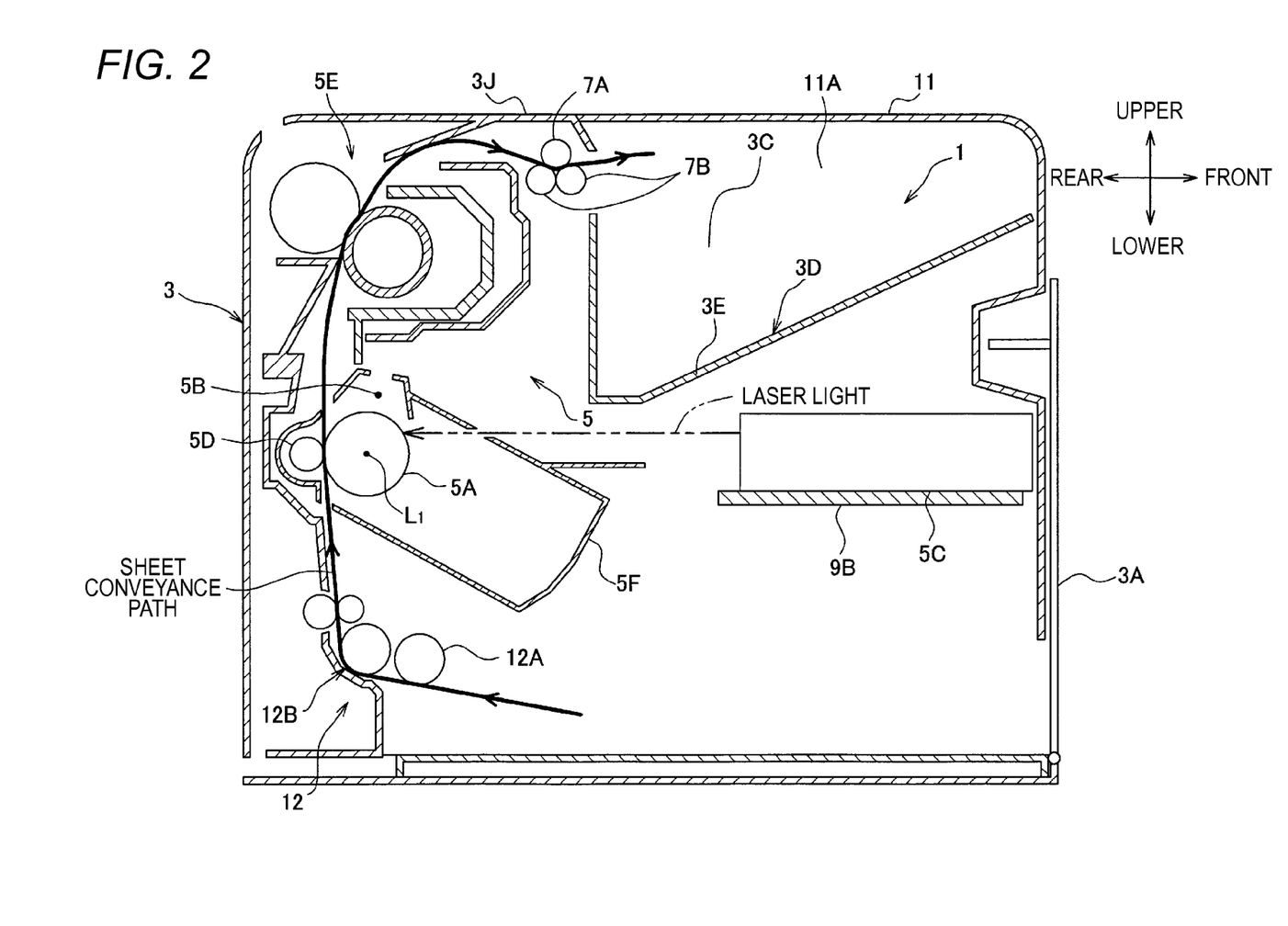
FIG. 2 is a central sectional view of the image forming apparatus 1 according to the first illustrative embodiment of the present invention.

FIG. 1 illustrates a state where the sheet discharge cover 3B is opened. The sheet discharge cover 3B consisting of a substantial rectangular plate can be rotated between a closed state where it closes an upper side of a sheet discharge part 3C and an opened state where it opens the upper side of the sheet discharge part 3C. As shown in FIG. 2, the sheet discharge part 3C is a space having a discharge tray 3D to which a sheet having an image formed thereon is discharged, and is provided at an upper side of the housing 3.

When forming an image, a user rotates forwards the sheet feeding cover 3A and the sheet discharge cover 3B to open the sheet feeding cover 3A and the sheet discharge cover 3B and places a sheet on the opened sheet feeding cover 3A. Thereby, the sheet placed on the sheet feeding cover 3A is fed to an image forming unit 5 in the housing 3. Then, the sheet having an image formed thereon is placed on a placement surface 3E, which is an upper surface of the discharge tray 3D.

The image forming unit 5 is configured to form an image on a sheet. The image forming unit 5 is an electrophotographic image forming unit and is provided with a photosensitive drum 5A, a charger 5B, an exposure device 5C, a transfer unit 5D, a fixing device 5E and the like. The placement surface 3E is provided at a position higher than a center line of rotation L1 of the photosensitive drum 5A.

The photosensitive drum 5A is configured to carry a developer image thereon. The charger 5B is configured to charge a surface of the photosensitive drum 5A. The exposure device 5C is configured to expose the charged photosensitive drum 5A, thereby forming an electrostatic latent image. The transfer unit 5D is configured to transfer the developer image carried on the photosensitive drum 5A to the sheet.

The fixing device 5E is configured to fix the developer image transferred on the sheet. The sheet discharged from the fixing device 5E is a sheet having an image formed thereon and is discharged towards the discharge tray 3D by a discharge roller 7A. A pair of pressing rollers 7B is configured to press the sheet to the discharge roller 7A. Thereby, the sheet is discharged while curl of the sheet is corrected.

The image forming unit 5 including a process casing 5F having the photosensitive drum 5A and the exposure device 5C mounted therein, the fixing device 5E and the like is mounted to an apparatus main body. The apparatus main body is a part that is not mounted, demounted and disassembled by the user upon the normal using, such as a pair of frames 9, the housing 3 and the like.

The pair of frames 9 is structure members having a substantial plate shape arranged at both sides with the image forming unit 5 such as the process casing 5F being interposed therebetween. In this illustrative embodiment, the pair of frames 9 is made of resin. The image forming unit 5 such as the process casing 5F is supported to the pair of frames 9.

The exposure device 5C is supported to the frames 9 with being held to a plate 9B shown in FIG. 2. The plate 9B is a metallic member arranged below the discharge tray 3D, extends over the pair of frames 9 and is fixed at both ends thereof to the respective frames 9.

Figure 3:
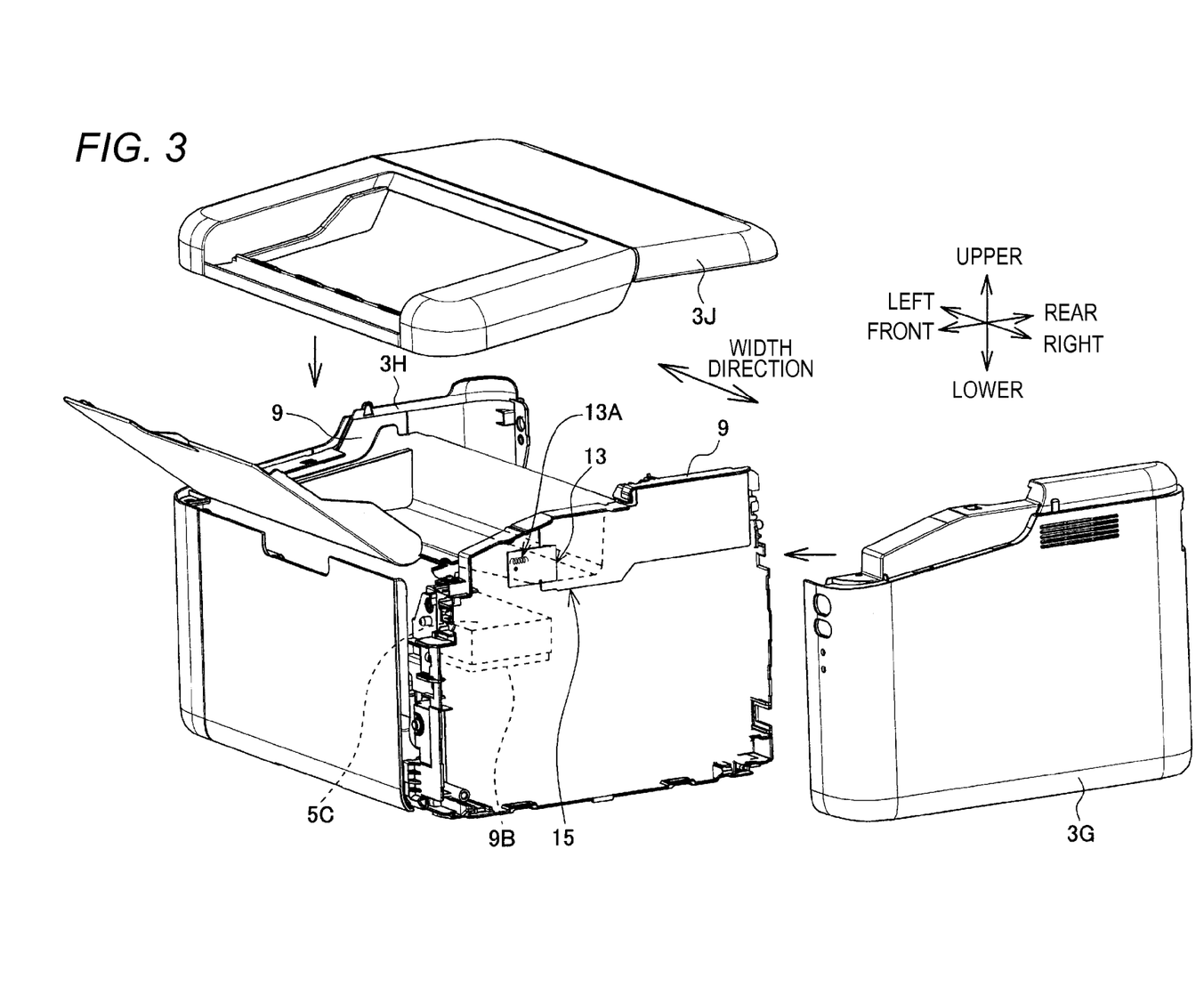
FIG. 3 is an exploded perspective view of the image forming apparatus 1 according to the first illustrative embodiment of the present invention.

As shown in FIG. 3, the housing 3 consists of external covers 3G to 3J and the like configured to cover the pair of frames 9 and the like from an outer side and to form an outward design surface. The external covers 3G, 3H are side covers configured to cover the pair of frames 9 from a width direction.

The external cover 3J is a top cover configured to cover the pair of frames 9 from the upper. Incidentally, the width direction is a direction along which the pair of frames 9 faces each other. In this illustrative embodiment, the width direction coincides with the left-right direction of the image forming apparatus 1.

A feeder mechanism 12 shown in FIG. 2 is configured to convey the sheet placed on the sheet feeding cover 3A towards the image forming unit 5. The feeder mechanism 12 has a pickup roller 12A, a separation part 12B and the like.

The rotary members such as the pickup roller 12A, the separation part 12B and the photosensitive drum 5A of the devices configuring the image forming unit 5 are configured to rotate as a driving force is supplied thereto from a driving source 8 (refer to FIG. 4) such as an electric motor.

The pickup roller 12A is configured to rotate with contacting the sheet positioned at one end of a plurality of stacked sheets in a stacking direction. When the plurality of sheets is delivered from the pickup roller 12A, the separation part 12B separates the sheets one by one and then delivers the same towards the image forming unit 5.

As shown in FIG. 1, both ends of the discharge tray 3D in the width direction are provided with wall parts 11, respectively. The pair of wall parts 11 has wall surfaces 11A. Each wall surface 11A is a wall surface standing upwardly beyond the placement surface 3E and facing the sheet discharge part 3C. The wall surfaces 11A, i.e., the pair of wall parts 11 is configured to restrain the sheet placed on the placement surface 3E from springing out from the discharge tray 3D in the width direction.

Figure 5A:
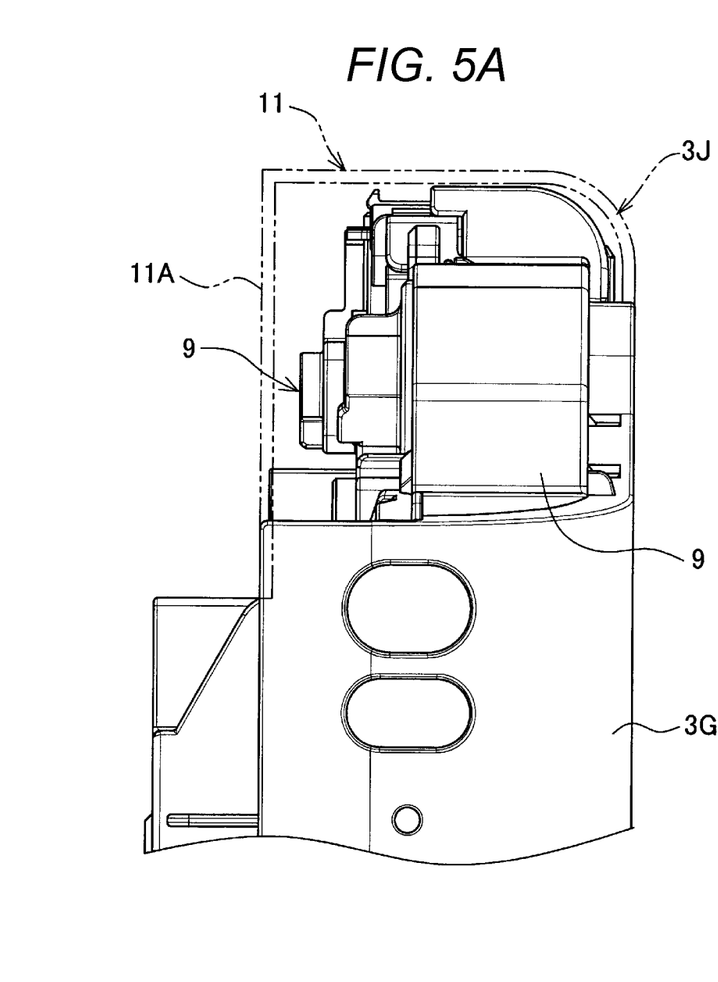
FIG. 5A is a front view of an upper end-side of a frame 9 at a state where an external cover 3J is detached.

As shown in FIG. 5A, an outer wall surface of each wall part 11 including the wall surface 11A is configured by the external cover (top cover) 3J. An upper end-side of each frame 9 is covered by the external cover 3J and is thus positioned in the wall part 11.

Figure 5B:
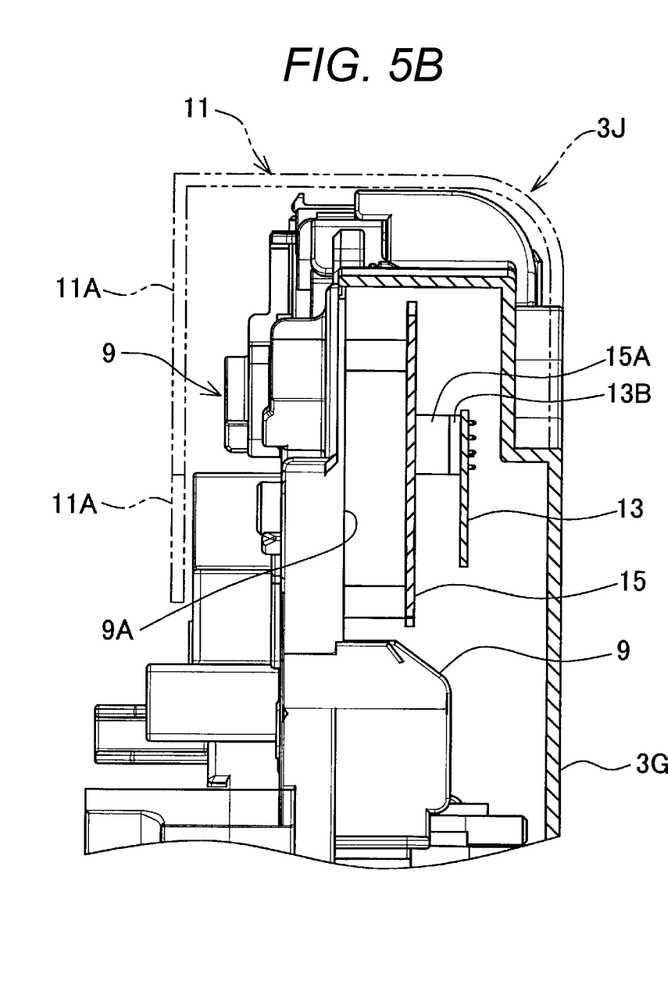
FIG. 5B is a sectional view of a part including a wireless board 17 at the state where the external cover 3J is detached.

As shown in FIG. 5B, at least a part of a wireless board 13 for wireless communication is positioned in the external cover 3J configuring the wall part 11. As shown in FIG. 3, the wireless board 13 has an antenna part 13A for wireless communication. At least the antenna part 13A of the wireless board 13 is positioned in the external cover 3J configuring the wall part 11.

A control board 15 is a board on which a control unit (not shown) configured to control operations of the image forming unit 5, the driving source 8 and the like is provided. As shown in FIG. 5B, the wireless board 13 is electrically connected to the control board 15 without a harness (a wiring).

That is, the control board 15 is provided with a first connector part 15A. The wireless board 13 is provided with a second connector part 13B configured to be fitted with the first connector part 15A. The wireless board 13 and the control board 15 are electrically connected to each other through the first connector part 15A and the second connector part 13B. As shown in FIG. 3, the control board 15 is arranged at a deviating position with respect to the antenna part 13A.

In this illustrative embodiment, the second connector part 13B and the first connector part 15A are fitted with each other, so that the wireless board 13 is mounted to the control board 15. That is, the first connector part 15A and the second connector part 13B also serve as an attachment part for attaching the wireless board 13 to the control board 15.

The control board 15 is mounted on an opposite surface side of the one end-side (the right end-side, in this illustrative embodiment) frame of the pair of frames 9 to the image forming unit 5, i.e., on a plate surface 9A facing the external cover 3G. The control board 15 and the wireless board 13 are arranged so that board surfaces thereof are parallel with the plate surface 9A of the frame 9.

Figure 6:
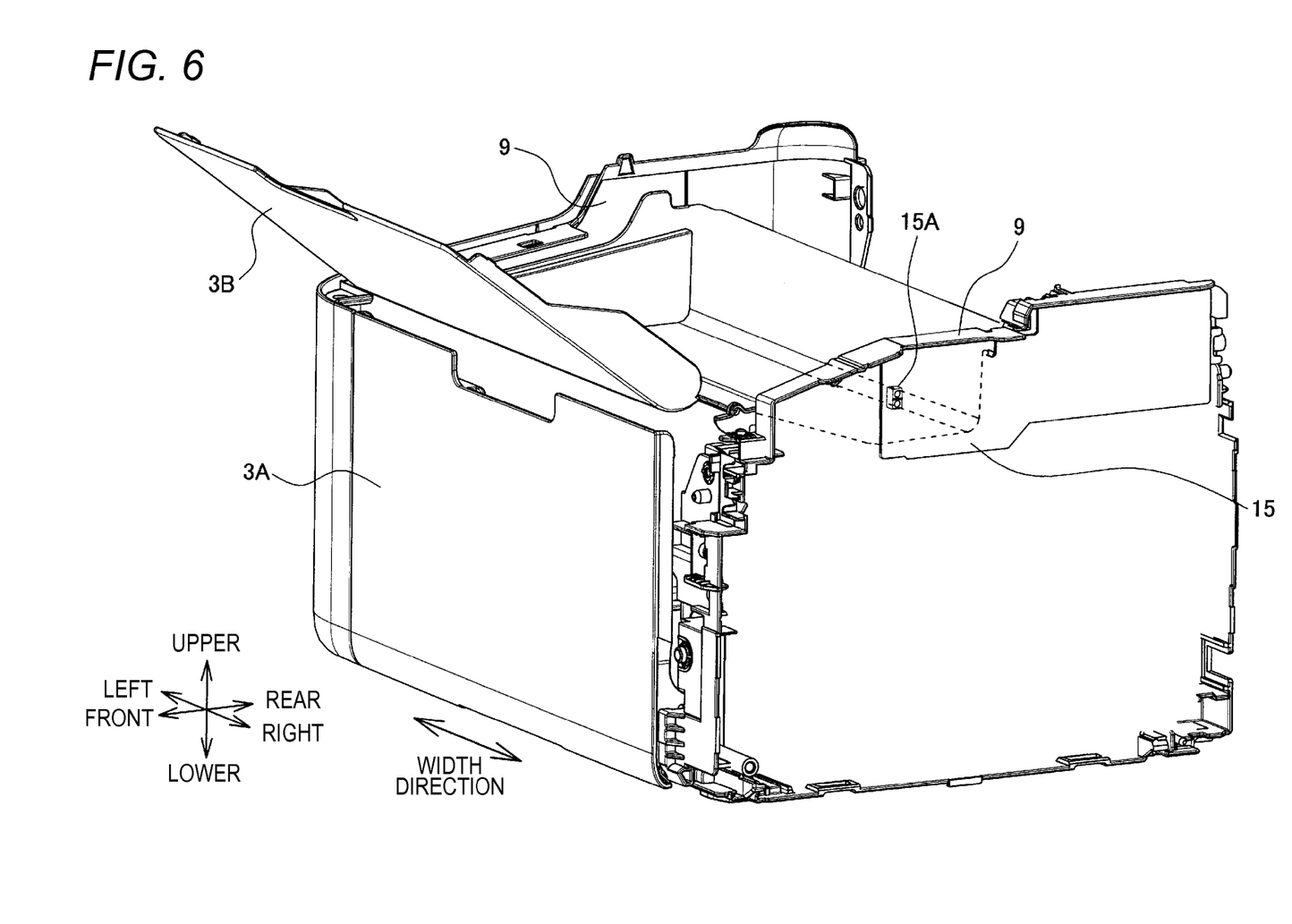
FIG. 6 illustrates positions of a control board 15 and a first connector part 15A of the image forming apparatus 1 according to the first illustrative embodiment of the present invention.

For this reason, a fitting direction for fitting the second connector part 13B to the first connector part 15A is parallel with the direction orthogonal to the plate surface 9A, i.e., the width direction. The first connector part 15A and the second connector part 13B are arranged in the wall part 11, as shown in FIG. 6.

Incidentally, the description 'the first connector part 15A, the antenna part 13A and the like are arranged in the wall part 11' means that when projecting the placement surface 3E and the wall part 11 onto a virtual plane orthogonal to the width direction, the projected first connector part 15A, antenna part 13A and the like are positioned between the projected placement surface 3E and the upper end of the projected wall part 11.

Figure 4:
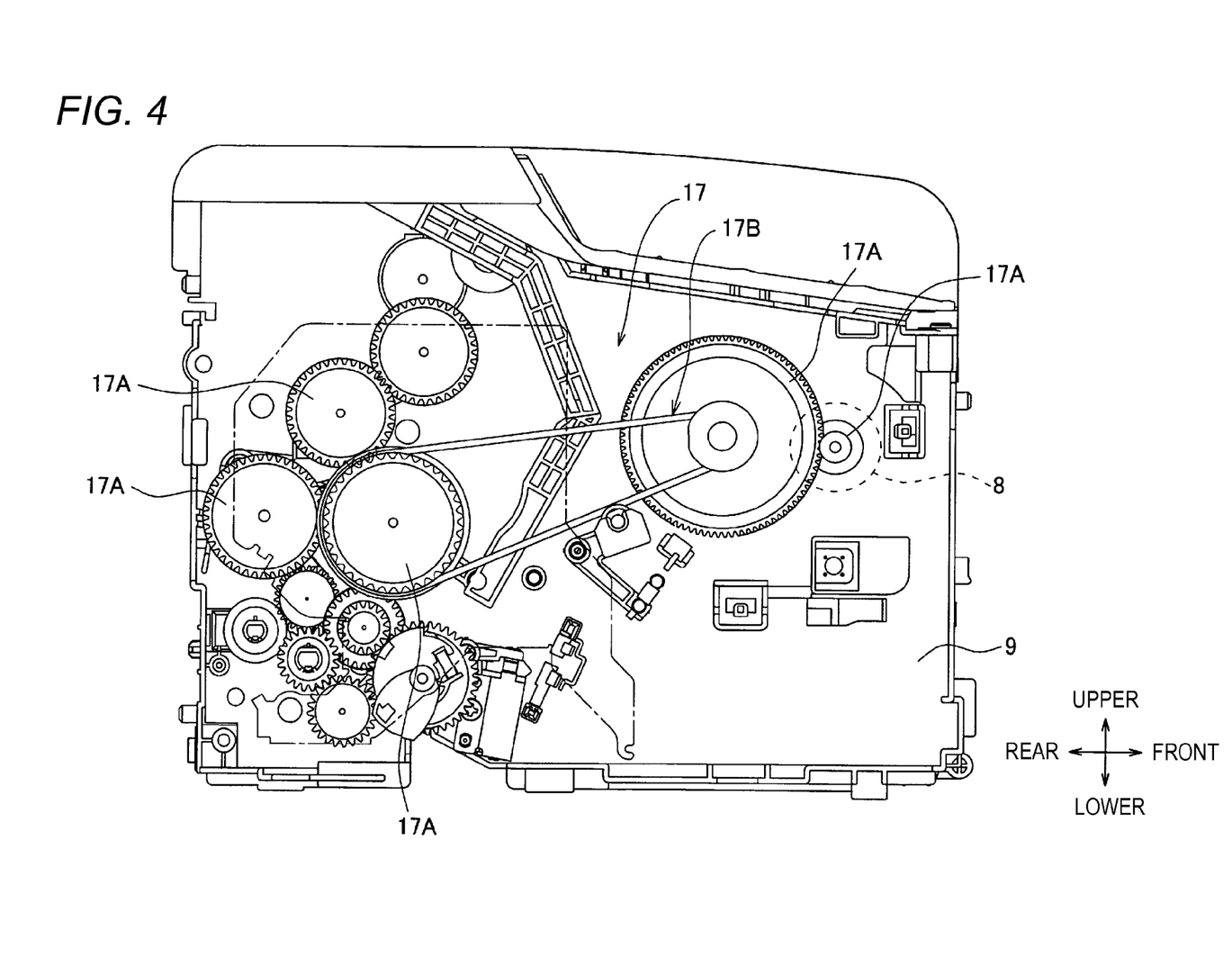
FIG. 4 illustrates a driving mechanism 17 of the image forming apparatus 1 according to the first illustrative embodiment of the present invention.

A driving mechanism 17 is arranged on the other end-side (the left end-side, in this illustrative embodiment) frame of the pair of frames 9 in the width direction, as shown in FIG. 4. The driving mechanism 17 is configured to supply a driving force generated from the driving source 8 to the device configuring the image forming unit 5 such as the photosensitive drum 5A. Meanwhile, in this illustrative embodiment, the driving mechanism 17 includes a plurality of gears 17A, an endless belt 17B such as a toothed belt and a V belt, and the like.

(2) Advantages of Image Forming Apparatus of Illustrative Embodiment

The illustrative embodiment has a feature that at least a part of the wireless board 13 is positioned in the wall part 11. Thereby, in this illustrative embodiment, the wireless board 13 is positioned at a part deviating upwardly with respect to the device for image formation to which a high voltage is applied, for example, the charger 5B, the transfer unit 5D and the like.

Since the wall part 11 is provided at the end portion-side of the discharge tray 3D in the width direction, it is difficult to accommodate the image forming unit 5 in the wall part 11. That is, the image forming unit 5 does not exist in the wall part 11. Further, it is possible to prevent communication sensitivity from being lowered due to the image forming unit 5.

Even when the sheet is placed on the discharge tray 3D, there is a very low possibility that the sheet will cause a wireless communication failure, because the sheet is not metal. Therefore, even when the sheet is placed on the discharge tray 3D, it is possible to prevent the communication sensitivity from being lowered.

Since the exposure device 5C is held by the metallic plate 9B, the plate 9B may cause the communication sensitivity to be lowered.

However, in this illustrative embodiment, the wireless board 13 is provided at the position higher than the plate 9B. Therefore, when the communication is performed at least from the upper, it is possible to prevent the communication sensitivity from being lowered due to the plate 9B.

The illustrative embodiment also has a feature that a part of the frame 9 configured to support the image forming unit 5 is positioned in the wall part 11 and the frame 9 is made of resin. Thereby, it is possible to prevent the communication sensitivity from being lowered due to the frame 9.

The illustrative embodiment also has a feature that the first connector part 15A of the control board 15 is positioned in the wall part 11. Thereby, since it is possible to position the wireless board 13 at the upwardly deviating part with respect to the image forming unit 5, it is possible to prevent the communication sensitivity from being lowered due to the image forming unit 5.

Second Illustrative Embodiment

Figure 7:
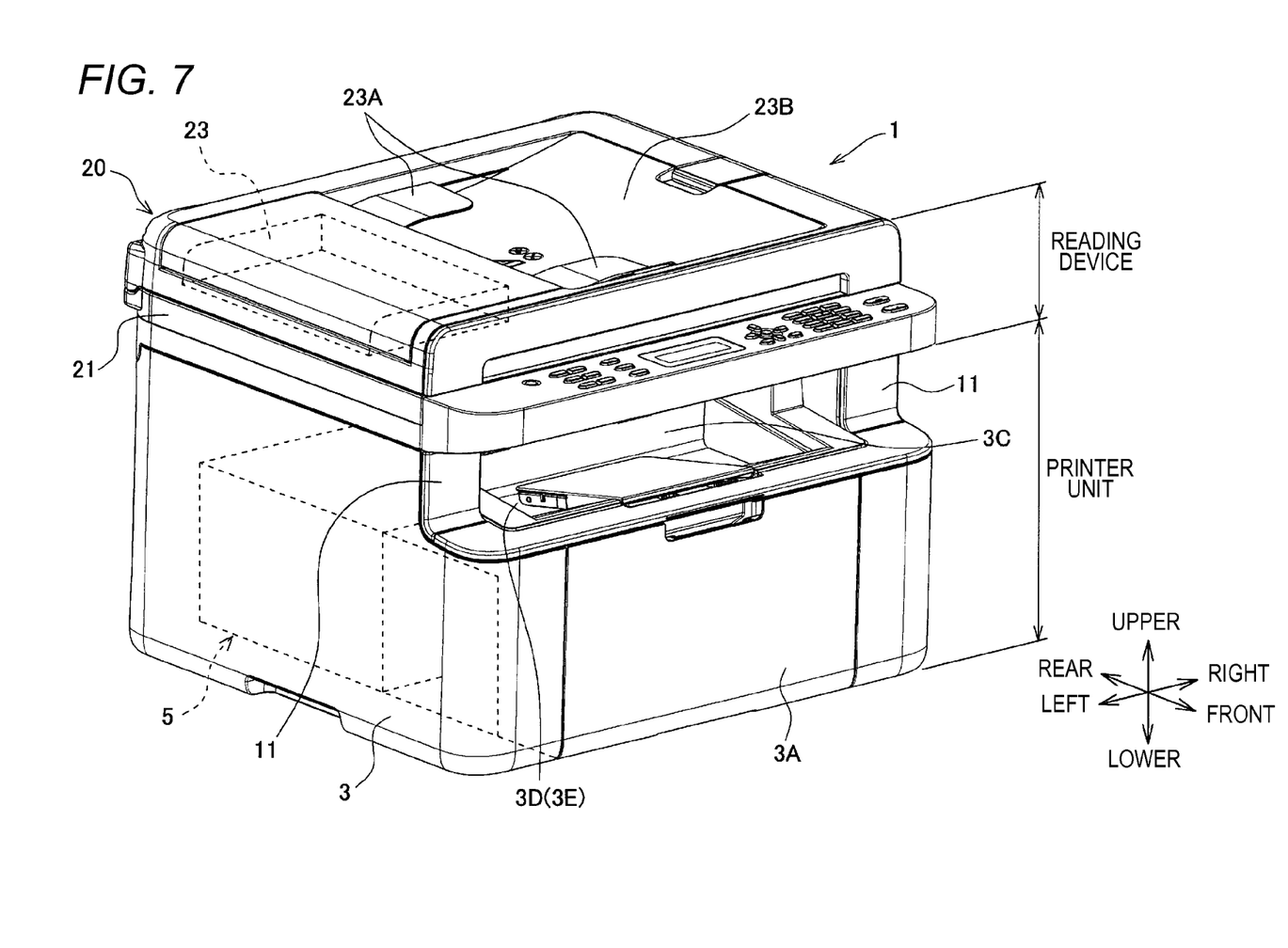
FIG. 7 is an outward perspective view of an image forming apparatus 1 according to a second illustrative embodiment of the present invention.

In a second illustrative embodiment, the present invention is applied to an image forming apparatus 1 having a reading device 20 integrated thereto, as shown in FIG. 7. The reading device 20 is configured to read a content of a sheet-like document. The reading device 20 is provided at the upper side of the printer unit having the image forming unit 5 accommodated therein, i.e., at the upper side of the discharge tray 3D.

In this illustrative embodiment, the pair of wall parts 11 is configured to also serve as a strut part configured to support the reading device 20. For this reason, in this illustrative embodiment, a vertical size of the pair of wall parts 11 is set so that a user can easily pull out the discharged sheet when the user puts a hand into the sheet discharge part 3C.

The reading device 20 has a conveyed document reading function and a placed document reading function. The conveyed document reading function is a function of reading a document being conveyed. The placed document reading function is a function of reading a document placed on a placement surface (not shown) of a document platen 21.

An auto document feeder mechanism 23 is configured to convey the document placed on a document tray 23A towards a reading unit (not shown) of the reading device 20 and to discharge the read document to a sheet discharge tray 23B. The auto document feeder mechanism 23 is arranged above the other end-side (the left end-side, in this illustrative embodiment) of the discharge tray 3D in the width direction.

The second illustrative embodiment has a feature that the auto document feeder mechanism 23 is arranged above the other end-side of the discharge tray 3D in the width direction. Therefore, it is possible to space the auto document feeder mechanism 23, which may cause a communication noise, from the wireless board 13. Further, it is possible to prevent the communication sensitivity from being lowered.

Other Illustrative Embodiments

In the above illustrative embodiments, the image forming apparatus 1 has the wireless board 13 upon shipment thereof by a manufacturer. However, the present invention is not limited thereto. For example, the present invention can be also applied to an image forming apparatus in which the wireless board 13 is set as an option.

That is, in an image forming apparatus in which the wireless board 13 is set as an option, the control board 15 is provided with the first connector part 15A. However, upon the shipment by the manufacturer, the wireless board 13 may not mounted to the first connector part 15A. Regarding this, the present invention can be also applied to an image forming apparatus in which the wireless board 13 is not mounted to the first connector part 15A.

In the above illustrative embodiments, the first connector part 15A and the second connector part 13B are fitted with each other without the harness. However, the present invention is not limited thereto. For example, the control board 15 and the wireless board 13 may be connected by the harness.

In the above illustrative embodiments, the wireless board 13 is parallel with the plate surface 9A of the frame 9. However, the present invention is not limited thereto. For example, the wireless board 13 may be arranged on the upper end-side of the frame 9 so that the wireless board 13 is orthogonal to the plate surface 9A.

In the above illustrative embodiments, the control board 15 is arranged at the deviating position with respect to the antenna part 13A. However, the present invention is not limited thereto. For example, when projecting the antenna part 13A and the control board 15 onto a virtual plane orthogonal to the width direction, the projected antenna part 13A and control board 15 may overlap with each other.

In the above illustrative embodiments, at least the antenna part 13A is positioned in the wall part 11. However, the present invention is not limited thereto. For example, at least a part of the wireless board 13 may be positioned in the wall part 11.

In the above illustrative embodiments, the image forming unit 5 is a monochrome electrophotographic type. However, the present invention is not limited thereto. For example, the image forming unit 5 may be a color electrophotographic type or an inkjet type.

Also, the present invention has only to match the scope of the invention defined in the claims and is not limited to the above illustrative embodiments.

As has been described, the following matters are disclosed in this specification.

(1) An image forming apparatus including: an image forming unit configured to form an image on a sheet; a wireless board for a wireless communication; a discharge tray having a placement surface on which the sheet having an image formed thereon is placed; and a wall part provided at one end-side of the discharge tray in a width direction and having a wall surface standing upwardly beyond the placement surface, wherein at least a part of the wireless board is positioned in the wall part.

(2) The image forming apparatus according to (1), wherein the wireless board is provided with an antenna part, and wherein at least the antenna part is positioned in the wall part.

(3) The image forming apparatus according to (2), further including a control board that is electrically coupled to the wireless board without a harness, wherein the control board is arranged at a deviating position with respect to the antenna part.

(4) The image forming apparatus according to (3), wherein the wireless board is provided with a second connector part configured to be fitted with a first connector part of the control board, and wherein the wireless board and the control board are coupled to each other through the first connector part and the second connector part.

(5) The image forming apparatus according to (4), wherein the second connector part is arranged in the wall part.

(6) The image forming apparatus according to any one of (1) to (5), further including a driving mechanism configured to supply a driving force to the image forming unit and arranged at the other end-side of an apparatus main body in the width direction.

(7) The image forming apparatus according to any one of (1) to (6), wherein a part of a frame that is configured to support the image forming unit is positioned in the wall part, and wherein the frame is made of resin.

(8) The image forming apparatus according to (7), wherein the frame has a plate shape, and wherein the wireless board is parallel with the frame.

(9) The image forming apparatus according to (7) or (8), wherein the wireless board is located across the frame from the image forming unit.

(10) The image forming apparatus according to any one of (1) to (9), further including: a reading device arranged above the discharge tray and configured to read a content of the sheet; and an auto document feeder mechanism configured to feed a document towards a reading unit of the reading device, wherein the auto document feeder mechanism is arranged above the other end-side of the discharge tray in the width direction.

(11) The image forming apparatus according to any one of (1) to (10), wherein the image forming unit is an electrophotographic type image forming unit having a photosensitive drum that is configured to carry a developer image thereon, and wherein the placement surface is provided at a position above a center line of rotation of the photosensitive drum.

(12) The image forming apparatus according to (11), wherein the image forming unit includes an exposure device configured to expose the photosensitive drum, wherein a metallic plate configured to support the exposure device is provided below the discharge tray, and wherein the wireless board is provided at a position above the metallic plate.

(13) The image forming apparatus according to any one of (1) to (10), wherein the image forming unit includes: a photosensitive drum configured to carry a developer image thereon, wherein the photosensitive drum is removably mountable to a housing at a first side of a bottom portion of the discharge tray closest to a bottom side of an apparatus main body; and an exposure device configured to expose the photosensitive drum by irradiating a surface of the photosensitive drum, wherein the exposure device is provided at a second side, which is opposite to the first side, of the bottom portion of the discharge tray, and wherein the wireless board is provided at a position above the exposure device and at the second side.

(14) The image forming apparatus according to (13), wherein the exposure device is configured to expose the photosensitive drum by irradiating a surface of the photosensitive drum with light from the second side toward the first side passing below the bottom portion of the discharge tray.

(15) The image forming apparatus according to any one of (1) to (14), wherein the discharge tray is provided at an upper side of a housing configured to accommodate therein the image forming unit.

(16) An image forming apparatus including: an image forming unit configured to form an image on a sheet; a discharge tray having a placement surface on which the sheet having an image formed thereon is placed; a wall part provided at one end-side of the discharge tray in a width direction and having a wall surface standing upwardly beyond the placement surface; and a control board, which is provided at one end-side in an apparatus main body in the width direction, and which includes a first connector part to which a wireless board for wireless communication is coupled, wherein the first connector part is positioned in the wall part.

(17) The image forming apparatus according to (16), wherein the image forming unit is an electrophotographic type image forming unit having a photosensitive drum that is configured to carry a developer image thereon, and wherein the placement surface is provided at a position above a center line of rotation of the photosensitive drum.

(18) The image forming apparatus according to (17), wherein the image forming unit includes an exposure device configured to expose the photosensitive drum, wherein a metallic plate configured to support the exposure device is provided below the discharge tray, and wherein the wireless board is provided at a position above the metallic plate.

(19) The image forming apparatus according to (16), wherein the image forming unit includes: a photosensitive drum configured to carry a developer image thereon, wherein the photosensitive drum is removably mountable to a housing at a first side of a bottom portion of the discharge tray closest to a bottom side of an apparatus main body; and an exposure device configured to expose the photosensitive drum by irradiating a surface of the photosensitive drum, wherein the exposure device is provided at a second side, which is opposite to the first side, of the bottom portion of the discharge tray, and wherein the first connector part is provided at a position above the exposure device and at the second side.

(20) The image forming apparatus according to any one of (16) to (19), wherein the discharge tray is provided at an upper side of a housing that is configured to accommodate therein the image forming unit.

What is claimed is:

1. An image forming apparatus comprising:
   an image forming unit configured to form an image on a sheet;
   a discharge tray having a placement surface on which the sheet having an image formed thereon is discharged in a sheet discharge direction;
   a wall part provided at one end-side of the discharge tray in a width direction of the discharge tray and having a wall surface standing vertically upward, which is a first direction, beyond the placement surface, the wall surface extending along the discharge tray in a second direction orthogonal to the width direction and the first direction, the wall part at least partially overlapping the discharge tray in the width direction;
   a wireless communication board having a surface on which one or more electronic components are mounted, the wireless communication board surface extending in the second direction; and
   a communication control board electrically coupled to the wireless communication board, the communication control board at least partially overlapping the wireless communication board in the width direction, the communication control board configured to control communication operations of the wireless communication board,
   wherein the wireless communication board extends beyond and downstream of the communication board in the sheet discharge direction, and
   wherein at least a part of the wireless communication board is positioned in the wall part.

2. The image forming apparatus according to claim 1, wherein the wireless communication board is provided with an antenna part, and
   wherein at least the antenna part is positioned in the wall part.

3. The image forming apparatus according to claim 2, further comprising a control board that is electrically coupled to the wireless communication board without a harness,
   wherein the control board is arranged at a deviating position with respect to the antenna part.

4. The image forming apparatus according to claim 3, wherein the wireless communication board is provided with a second connector part configured to be fitted with a first connector part of the control board, and
   wherein the wireless communication board and the control board are coupled to each other through the first connector part and the second connector part.

5. The image forming apparatus according to claim 4, wherein the second connector part is arranged in the wall part.

6. The image forming apparatus according to claim 1, further comprising a driving mechanism configured to supply a driving force to the image forming unit and arranged at the other end-side of an apparatus main body in the width direction.

7. The image forming apparatus according to claim 1, wherein a part of a frame that is configured to support the image forming unit is positioned in the wall part, and
   wherein the frame is made of resin.

8. The image forming apparatus according to claim 7, wherein the frame has a plate shape, and
   wherein the wireless communication board is parallel with the frame.

9. The image forming apparatus according to claim 7, wherein the wireless communication board is located across the frame from the image forming unit.

10. The image forming apparatus according to claim 1, further comprising:
    a reading device arranged above the discharge tray and configured to read a content of the sheet; and
    an auto document feeder mechanism configured to feed a document towards a reading unit of the reading device,
    wherein the auto document feeder mechanism is arranged above the other end-side of the discharge tray in the width direction.

11. The image forming apparatus according to claim 1, wherein the image forming unit is an electrophotographic type image forming unit having a photosensitive drum that is configured to carry a developer image thereon, and
    wherein the placement surface is provided at a position above a center line of rotation of the photosensitive drum.

12. The image forming apparatus according to claim 11, wherein the image forming unit comprises an exposure device configured to expose the photosensitive drum,
    wherein a metallic plate configured to support the exposure device is provided below the discharge tray, and
    wherein the wireless communication board is provided at a position above the metallic plate.

13. The image forming apparatus according to claim 1, wherein the image forming unit comprises:
    a photosensitive drum configured to carry a developer image thereon, wherein the photosensitive drum is removably mountable to a housing at a first side of a bottom portion of the discharge tray closest to a bottom side of an apparatus main body; and
    an exposure device configured to expose the photosensitive drum by irradiating a surface of the photosensitive drum, wherein the exposure device is provided at a second side, which is opposite to the first side, of the bottom portion of the discharge tray, and
    wherein the wireless communication board is provided at a position above the exposure device and at the second side.

14. The image forming apparatus according to claim 13, wherein the exposure device is configured to expose the photosensitive drum by irradiating a surface of the photosensitive drum with light from the second side toward the first side passing below the bottom portion of the discharge tray.

15. The image forming apparatus according to claim 1, wherein the discharge tray is provided at an upper side of a housing configured to accommodate therein the image forming unit.

16. The image forming apparatus according to claim 1, further comprising a control board that is electrically coupled to the wireless board, the control board extending in the first direction and provided along the wall surface.

17. An image forming apparatus comprising:
   an image forming unit configured to form an image on a sheet;
   a discharge tray having a placement surface on which the sheet having an image formed thereon is placed;
   an integral wall part provided at one end-side of the discharge tray in a width direction of the discharge tray and having a wall surface standing vertically upward, which is a first direction, beyond the placement surface, the wall surface being at least partially exposed to an exterior of the image forming apparatus, the integral wall part at least partially overlapping the discharge tray in the width direction; and
   a control board, which is provided at one end-side in an apparatus main body in the width direction, at least one electronic component mounted to a surface of the control board, the control board surface extending in the first direction, control board further comprising a first connector part to which a wireless board for wireless communication is coupled,
   wherein the first connector part is positioned in the wall part such that the first connector part at least partially overlaps the wall surface of the integral wall part when viewed in the width direction.

18. The image forming apparatus according to claim 17, wherein the image forming unit is an electrophotographic type image forming unit having a photosensitive drum that is configured to carry a developer image thereon, and
   wherein the placement surface is provided at a position above a center line of rotation of the photosensitive drum.

19. The image forming apparatus according to claim 18, wherein the image forming unit comprises an exposure device configured to expose the photosensitive drum,
   wherein a metallic plate configured to support the exposure device is provided below the discharge tray, and
   wherein the wireless board is provided at a position above the metallic plate.

20. The image forming apparatus according to claim 17, wherein the image forming unit comprises:
   a photosensitive drum configured to carry a developer image thereon, wherein the photosensitive drum is removably mountable to a housing at a first side of a bottom portion of the discharge tray closest to a bottom side of an apparatus main body; and
   an exposure device configured to expose the photosensitive drum by irradiating a surface of the photosensitive drum, wherein the exposure device is provided at a second side, which is opposite to the first side, of the bottom portion of the discharge tray, and
   wherein the first connector part is provided at a position above the exposure device and at the second side.

21. The image forming apparatus according to claim 17, wherein the discharge tray is provided at an upper side of a housing that is configured to accommodate therein the image forming unit.

* * * * *

UNITED STATES PATENT AND TRADEMARK OFFICE
CERTIFICATE OF CORRECTION

| | | |
|---|---|---|
| PATENT NO. | : 9,503,595 B2 | Page 1 of 1 |
| APPLICATION NO. | : 14/552731 | |
| DATED | : November 22, 2016 | |
| INVENTOR(S) | : Junki Ueyama | |

It is certified that error appears in the above-identified patent and that said Letters Patent is hereby corrected as shown below:

In the Claims

In Column 11, Claim 17, Line 30:
Please delete "direction, control board" and insert --direction, the control board--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*